(12) United States Patent
Cairl et al.

(10) Patent No.: US 11,835,960 B2
(45) Date of Patent: Dec. 5, 2023

(54) SYSTEM AND METHOD FOR SEMANTICALLY IDENTIFYING ONE OR MORE OF AN OBJECT AND A LOCATION IN A ROBOTIC ENVIRONMENT

(71) Applicant: Fetch Robotics, Inc., San Jose, CA (US)

(72) Inventors: Brian Cairl, Astoria, NY (US); Derek King, San Jose, CA (US); Sarah Elliott, Mountain View, GA (US); Alex Henning, San Jose, CA (US); Melonee Wise, San Jose, CA (US); Russell Toris, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 81 days.

(21) Appl. No.: 16/259,261

(22) Filed: Jan. 28, 2019

(65) Prior Publication Data
US 2020/0241551 A1  Jul. 30, 2020

(51) Int. Cl.
*G05D 1/02* (2020.01)
*B25J 9/16* (2006.01)
*G06K 19/06* (2006.01)

(52) U.S. Cl.
CPC ............ *G05D 1/0248* (2013.01); *B25J 9/162* (2013.01); *B25J 9/1666* (2013.01); *G05D 1/0234* (2013.01); *G05D 1/0251* (2013.01); *G06K 19/06037* (2013.01)

(58) Field of Classification Search
CPC ....... B25J 9/162; B25J 9/1666; G05D 1/0234; G05D 1/0248; G05D 1/0251; G05D 2201/0216; G06K 19/06037
See application file for complete search history.

(56) References Cited

U.S. PATENT DOCUMENTS

| | | | |
|---|---|---|---|
| 9,744,665 B1 * | 8/2017 | Linnell | ............... B25J 9/10 |
| 2006/0020370 A1 * | 1/2006 | Abramson | ......... G05D 1/0244 700/245 |
| 2013/0085625 A1 | 4/2013 | Wolle | |
| 2014/0114525 A1 * | 4/2014 | Ebrahimi Afrouzi | ...................... G05D 1/0242 701/23 |

(Continued)

OTHER PUBLICATIONS

"Energy and Intensity of Light." Physics Libre Texts (Nov. 15, 2016).

(Continued)

*Primary Examiner* — Jeff A Burke
*Assistant Examiner* — Zachary Joseph Wallace

(57) ABSTRACT

A system includes: a mobile robot comprising a sensor, the robot further comprising a computer, the robot operating in an environment; a server operably connected to the robot via a communication system, the server configured to manage the robot; a controller operably connected to the robot, the controller operably connected to the server, the controller configured to control the robot; and an object of interest marked with a marker at one or more of an approximate height and an approximate field of view of the sensor, the sensor generating data describing the object of interest, the computer configured to identify one or more of the object of interest and the location using one or more of a shape of the object of interest and an intensity of data describing the object of interest.

14 Claims, 8 Drawing Sheets

(56) References Cited

U.S. PATENT DOCUMENTS

| | | | | |
|---|---|---|---|---|
| 2017/0191822 A1* | 7/2017 | Becker | ................ | G01B 21/042 |
| 2017/0225891 A1* | 8/2017 | Elazary | ................ | B65G 1/1375 |
| 2017/0249745 A1* | 8/2017 | Fiala | ...................... | A63F 13/65 |
| 2017/0252925 A1* | 9/2017 | Cho | ...................... | B25J 9/1666 |
| 2018/0068255 A1* | 3/2018 | Hance | .................. | B65G 61/00 |
| 2018/0089616 A1* | 3/2018 | Jacobus | ............... | G05D 1/0274 |
| 2018/0180740 A1* | 6/2018 | Shaffer | ................ | G05D 1/0236 |
| 2018/0199162 A1* | 7/2018 | Yamamoto | .............. | G01S 19/07 |
| 2018/0330172 A1* | 11/2018 | Lee | ...................... | G01C 21/206 |
| 2019/0193629 A1* | 6/2019 | Zevenbergen | ......... | B60Q 1/525 |
| 2019/0220033 A1* | 7/2019 | Cho | ...................... | B60L 53/00 |
| 2020/0091565 A1* | 3/2020 | Vain | ....................... | B60L 53/35 |
| 2020/0103914 A1* | 4/2020 | Holz | ................. | G01C 21/3602 |
| 2020/0103917 A1* | 4/2020 | Murphy | ............... | G05D 1/0236 |
| 2020/0264616 A1* | 8/2020 | Suzuki | .................... | G01S 17/93 |
| 2020/0333790 A1* | 10/2020 | Kobayashi | ............. | G01C 3/085 |

OTHER PUBLICATIONS

"Laser Scanning for the Evaluation of Historic Structures," by Belen Riveiro et al., published at pp. 807-835 (p. 835 has the definition of "intensity") of the book Civil and Environmental Engineering: Concepts, Methodologies, Tools, and Applications, by the Information Resources Management Association (IGI Global, 2016).

* cited by examiner

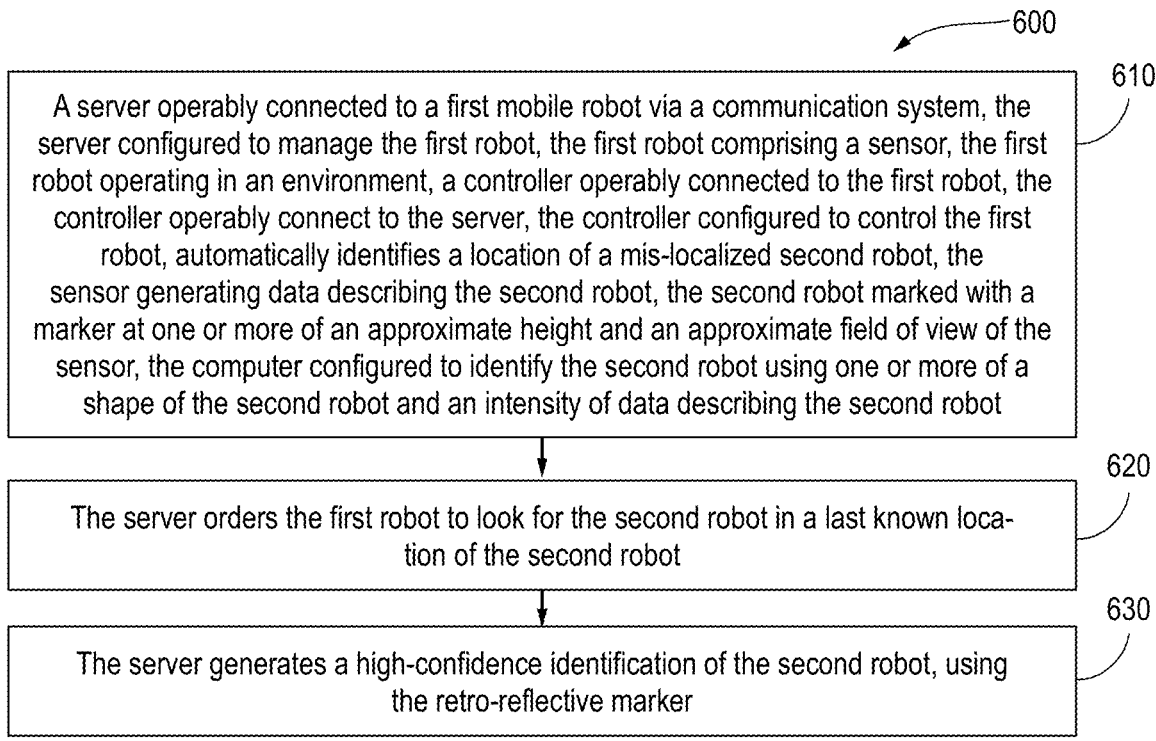

SYSTEM AND METHOD FOR SEMANTICALLY IDENTIFYING ONE OR MORE OF AN OBJECT AND A LOCATION IN A ROBOTIC ENVIRONMENT

SUMMARY

Embodiments of the invention relate in general to a system and method for semantically identifying one or more of an object of interest and a location in a robotic environment. More specifically, embodiments of the invention relate to a system and method for semantically identifying one or more of an object of interest and a location in a robotic environment using an infrared sensor. Further embodiments of the invention relate to a system and method for semantically identifying one or more of an object of interest and a location in a robotic environment, enabling a robot to use the semantic identification to do one or more of make a decision and take an action.

A system for semantically identifying one or more of an object of interest and a location of a mobile robot in an environment of the robot includes: a mobile robot comprising a sensor, the robot further comprising a computer, the robot operating in an environment; a server operably connected to the robot via a communication system, the server configured to manage the robot; a controller operably connected to the robot, the controller operably connected to the server, the controller configured to control the robot; and an object of interest marked with a marker at one or more of an approximate height and an approximate field of view of the sensor, the sensor generating data describing the object of interest, the computer configured to identify one or more of the object of interest and the location using one or more of a shape of the object of interest and an intensity of data describing the object of interest.

A method for semantically identifying an object of interest in an environment of a mobile robot includes: automatically identifying, by a server operably connected to a mobile robot via a communication system, the server configured to manage the robot, the robot comprising a sensor, the robot further comprising a computer, the robot operating in an environment, a controller operably connected to the robot, the controller operably connected to the server, the controller configured to control the robot, an object of interest, the sensor generating data describing the object of interest, the object of interest marked with a marker at one or more of an approximate height and an approximate field of view of the sensor, the computer configured to identify the object of interest using one or more of a shape of the object of interest and an intensity of data describing the object of interest; automatically determining, by the computer, an identity code associated with the identified object of interest; using the identity code, by the computer, determining a location of the object of interest; sending, by the computer, to the server, the determined location; and using the determined location, by the server, automatically placing the object of interest in a correct location in a map.

A method for semantically identifying, using a first mobile robot, a location of a mis-localized second mobile robot in an environment of the first mobile robot includes: automatically identifying, by a server operably connected to a first mobile robot via a communication system, the server configured to manage the first robot, the first robot comprising a sensor, the first robot further comprising a computer, the first robot operating in an environment, a controller operably connected to the first robot, the controller operably connected to the server, the controller configured to control the first robot, a location of a mis-localized second robot, the sensor generating data describing the second robot, the second robot marked with a marker at one or more of an approximate height and an approximate field of view of the sensor, the computer configured to identify the second robot using one or more of a shape of the second robot and an intensity of data describing the second robot; ordering, by the server, the first robot to look for the second robot in a last known location of the second robot; and generating, by the computer, a high-confidence identification of the second robot, using the marker.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 6 is a flow chart of a method for semantically identifying, using a first mobile robot, a location of a mis-localized second mobile robot in an environment of the first mobile robot.

DETAILED DESCRIPTION

Figure 1A:
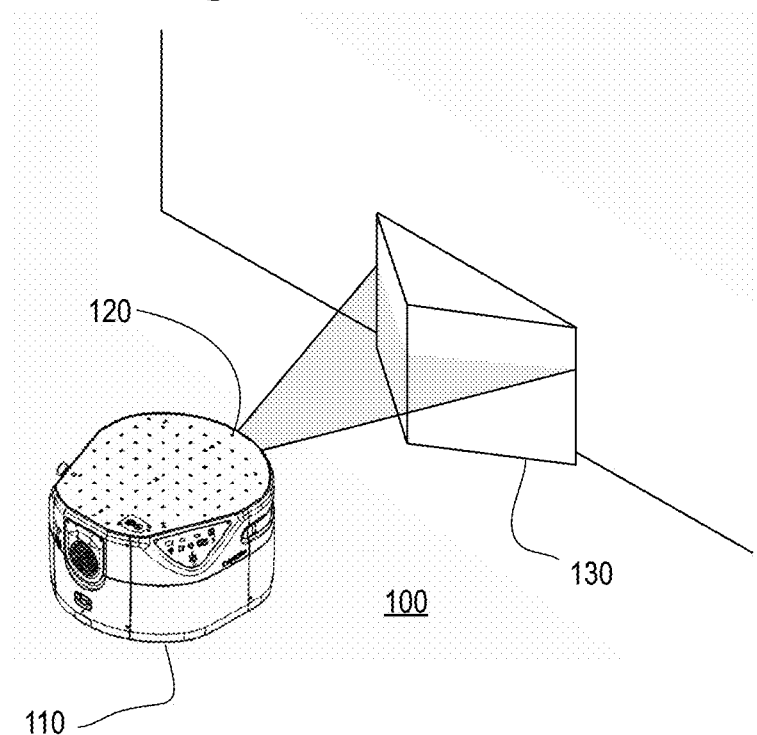
FIGS. 1A-1F are a set of six diagrams for a system and method for semantically identifying one or more of an object of interest and a location in a robotic environment showing a mobile robot and showing a representative robotic target for six different scenarios in which the system and method semantically identifies the one or more of the object of interest and the location in the robotic environment.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention relate in general to a system and method for semantically identifying one or more of an object of interest and a location in an environment of a mobile robot. The robot comprises a sensor. The robot further comprises a computer. Typically, but not necessarily, the sensor comprises an infrared sensor. Typically, but not necessarily, the sensor comprises a laser sensor. Typically, but not necessarily, the sensor comprises a three-dimensional (3D) sensor. Typically, but not necessarily, the sensor comprises a three-dimensional (3D) camera configured to provide both two-dimensional (2D) spatial information and also information on depth of the object of interest.

In this system, an object of interest is marked with a marker. For example, the marker comprises one or more of a retro-reflective marker and a precision marker. For example, the object of interest comprises one or more of a forklift, a box, a pallet, a second robot, a cart, a golf cart, a dock bay door, a charge dock, a human, and another object of interest. For example, the marker comprises one or more of tape, paint, barcodes, and another marker. For example, the marker is placed at or more of an approximate height and an approximate field of view of an infrared sensor of a robot. This allows the system to identify the object of interest based on not only the shape of the object of interest but also the intensity of the data regarding the object of interest.

For example, using the marker, the computer automatically identifies a charge dock. For example, the computer automatically determines an identity code associated with the identified charge dock. For example, alternatively, or additionally, the server automatically determines the identity code associated with the identified charge dock. For example, the computer automatically determines a location of the charge dock. For example, alternatively, or additionally, the server automatically determines the location of the charge dock. For example, the computer sends the determined location to the server. For example, the server automatically places the charge dock in a correct location in a map. Additionally, the computer can apply a barcode to the charge dock. Alternatively, or additionally, the server applies the bar code to the charge dock. For example, the barcode is usable to do one or more of count charge cycles and provide a confirming location when the robot is mis-localized.

A sensor can have a blind spot. For example, a laser sensor can have a blind spot. A map generated by the laser sensor can also have a blind spot. For example, a ladder may be too high off the ground to be detected by a sensor. According, the ladder may lie in a blind spot. A hole in the environment refers to one or more of a danger area into which a robot should not enter and an object of interest outside the sensor's field of view. The danger area comprises one or more of a region into which the robot should not drive, a confined space, a region where a visual warning is required on entry, a region where auditory warning is required on entry, and another danger area. A retro-reflective marker on the floor can indicate to a laser an object of interest slightly above a laser's field of view. Retro-reflective markers effectively expand the sensor's field of view by avoiding restrictions that might otherwise exist of a laser height up of up to approximately 0.4 meters from where the wheels touch the floor and extending out approximately 100 meters from the sensor. Accordingly, embodiments of the invention prevent a robot from driving into a danger area even if it is mis-localized, because the retro-reflective marker advises it of the danger area.

As another example, the robot can more easily and precisely follow a human wearing clothing comprising a retro-reflective marker. Higher confidence in detection and recognition is available when the human goes around a corner and the robot briefly loses sight of the human.

For example, the marker comprises a precision marker. A precision marker is defined as a marker in the environment configured to align precisely with the robot. For example, the precision marker is configured to align with the robot with an error tolerance less than or equal to approximately 2.5 centimeters.

FIGS. 1A-1F are a set of six diagrams for a system and method for semantically identifying one or more of an object of interest and a location in a robotic environment showing a mobile robot and showing a representative robotic target for six different scenarios in which the system and method semantically identifies the one or more of the object of interest and the location in the robotic environment.

Figure 1B:
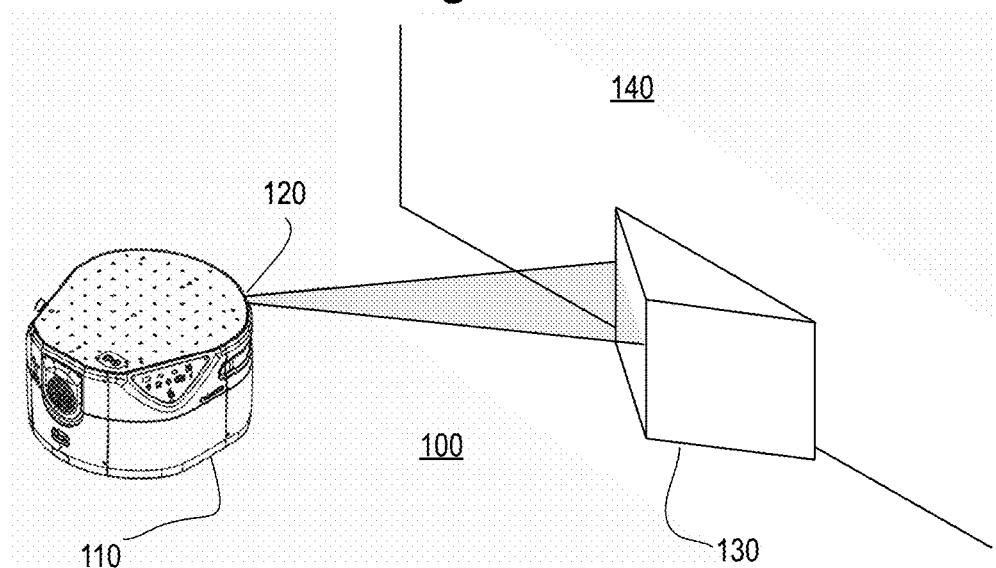
Figure 1C:
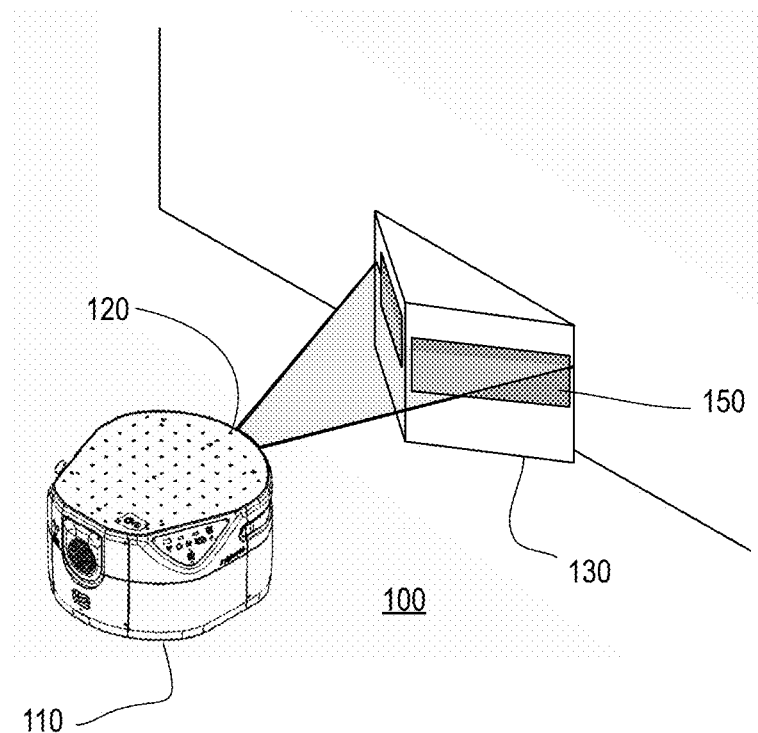
Figure 1D:
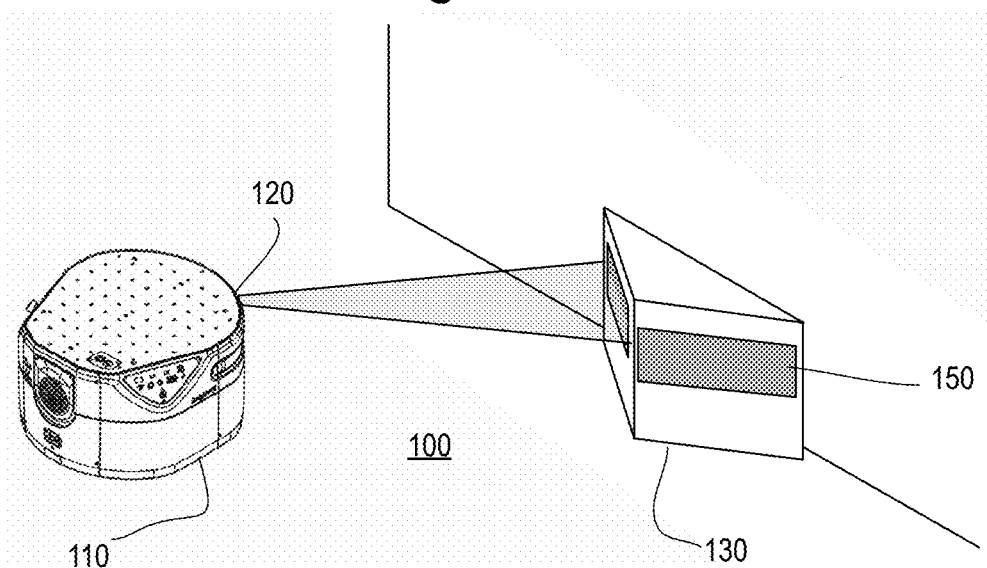
Figure 1E:
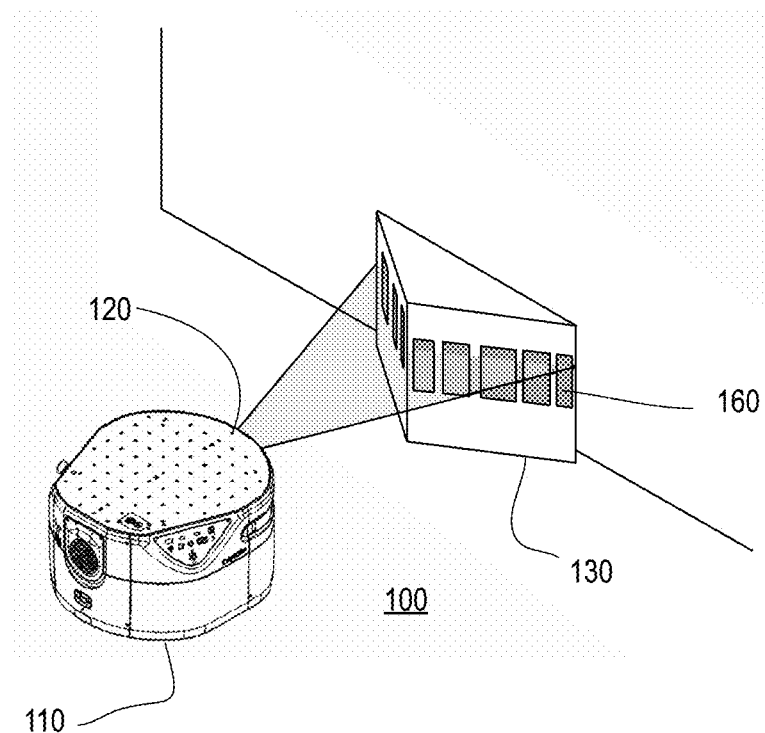
Figure 1F:
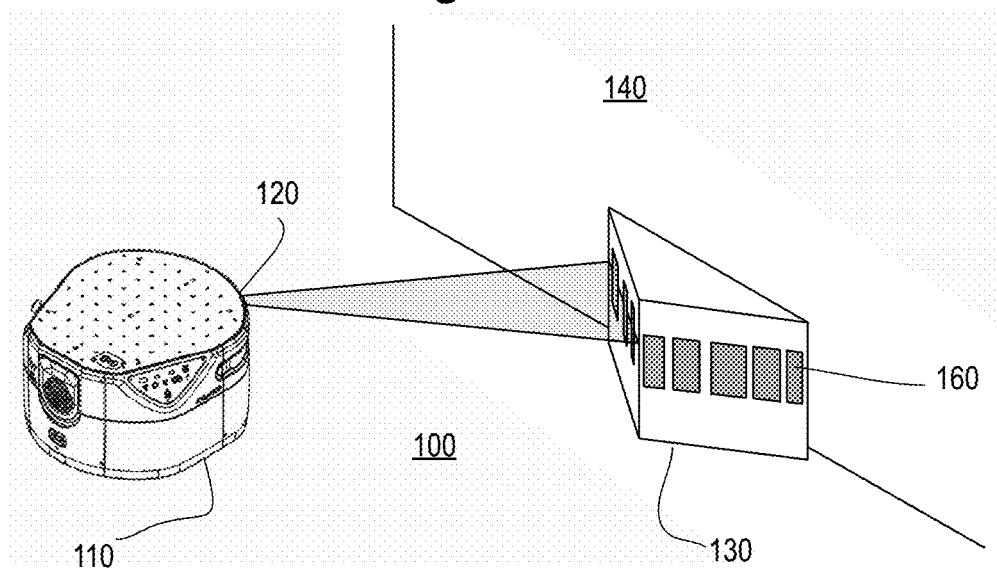

FIG. 1A-1F show how a robot might detect the charge dock using the shape of the dock based on the shape of the corresponding laser scan. When the robot is off-center from the dock, it does not see the whole shape of the dock and the confidence of the detection is reduced. By adding a retro-reflective marker to the charge dock, the system can identify the charge dock using one or more of a shape of the charge dock and an intensity of the data. Preferably, the system can identify the charge dock using both the shape of the charge dock and the intensity of the data describing the object of interest. As shown in FIGS. 1E-1F, if a barcode-like pattern is added, the pattern can be used to uniquely identify a specific charge dock.

Each of FIGS. 1A-1F show a system 100 in which a mobile robot 110 using a laser scanner 120 to scan a triangular target 130. The target 130 comprises a charge dock 130.

In FIG. 1A, the robot 110 can see the full charge dock 130.

In FIG. 1B, the charge dock 130 is partially occluded, making it more difficult for the robot 110 to perform robust segmentation of the charge dock 130 from the background points 140.

In FIGS. 1C-1D, the charge dock 130 is covered by a retro-reflective marker 150.

In FIG. 1C, the robot 110 can see the full charge dock 130.

In FIG. 1D, the charge dock 130 is partially occluded, but the robot 110 can perform robust segmentation of the charge dock 130 using infrared light information.

In FIGS. 1E-1F, the charge dock 130 is covered by a retro-reflective marker 150 comprising a coded pattern 160.

In FIG. 1E, the robot 110 can see the full charge dock 130.

In FIG. 1F, the charge dock 130 is partially occluded, but the robot 110 can see the coded pattern 160 and thus can perform robust segmentation of the charge dock 130.

Figure 2:
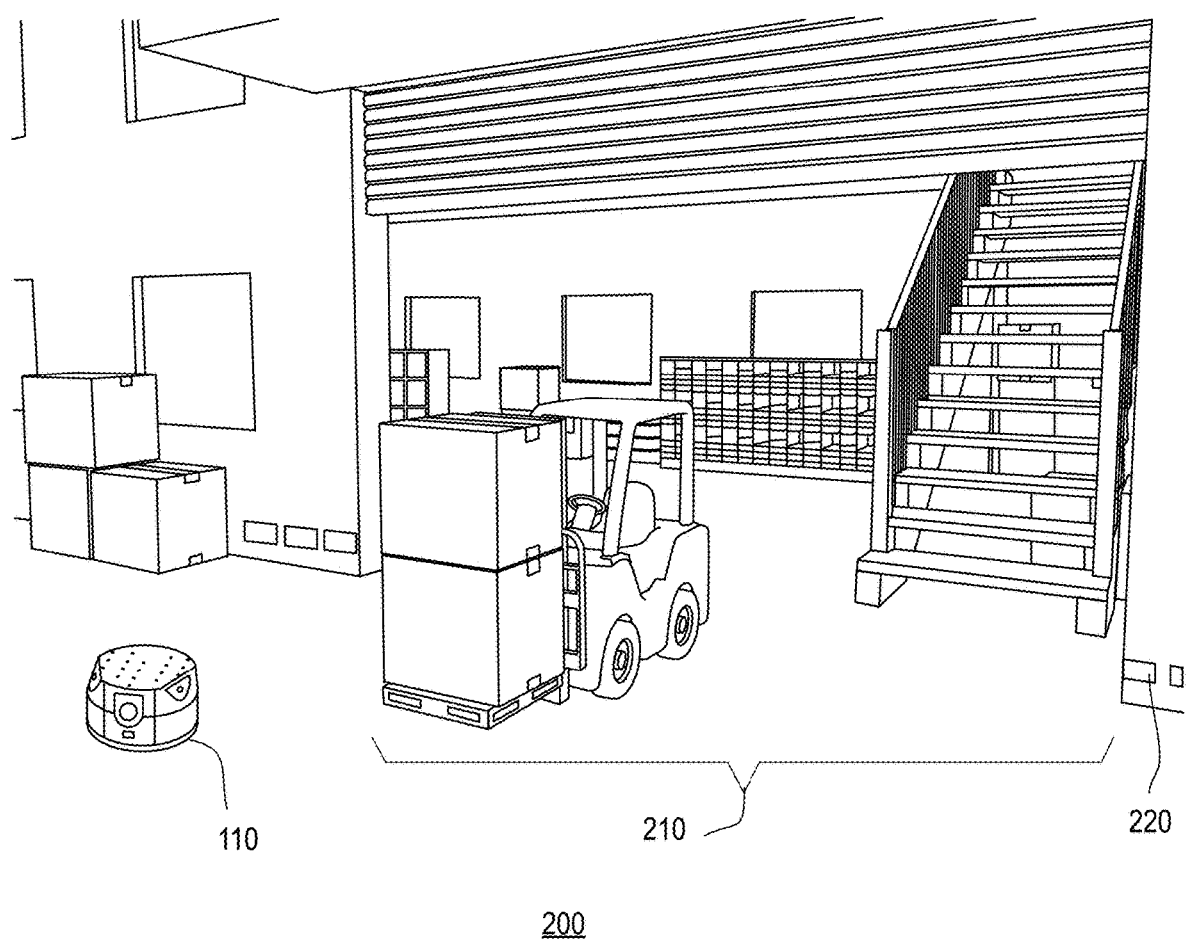
FIG. 2 is a drawing of a system for semantically identifying one or more of an object of interest and a location in a robotic environment, showing a passageway that has been semantically identified using a retro-reflective marker.

FIG. 2 is a drawing of a system 200 for semantically identifying one or more of an object of interest and a location in a robotic environment, showing a passageway 210 that has been marked using a retro-reflective marker 220 so that the robot 110 can semantically identify the passageway 210. As shown, the passageway 210 comprises a doorway.

The marker 220 can be used to indicate that the robot 110 should not pass through the passageway 210. Alternatively, or additionally, the marker 220 can be used to indicate that the robot 110 should play audio as it passes through the doorway 210. Alternatively, or additionally, the marker 220 can be used to indicate that the robot 110 should slow down as it passes through the doorway 210.

Figure 3:
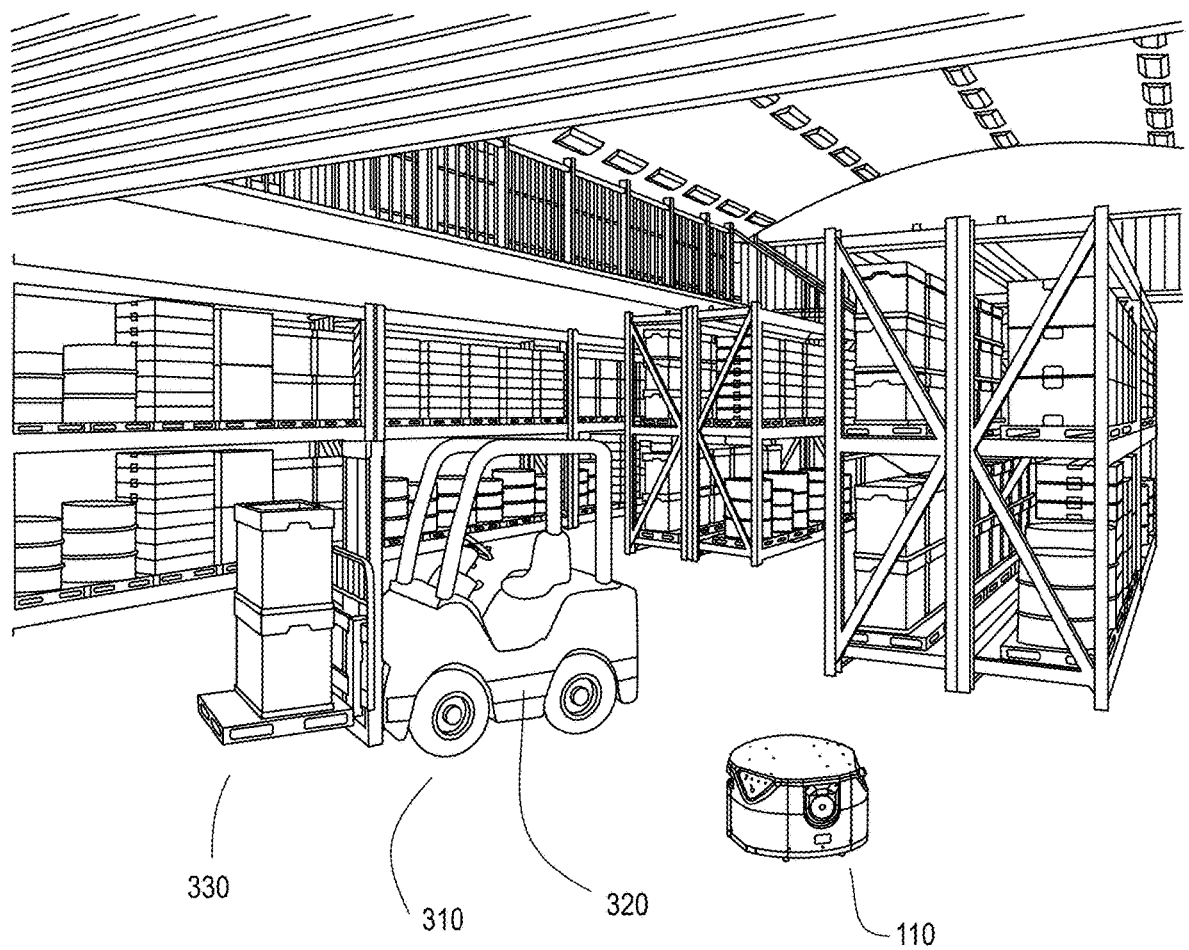
FIG. 3 is a drawing of a system for semantically identifying one or more of an object of interest and a location in a robotic environment, showing a forklift that has been semantically identified using a retro-reflective marker.

FIG. 3 is a drawing of a system 300 for semantically identifying one or more of an object of interest and a location in an environment of the mobile robot 110, showing a forklift 310 that the robot 110 has semantically identified using a retro-reflective marker 320.

The robot 110 could use that information to determine a location of a forklift tine 330 relative to the forklift 310. The robot can thereby avoid driving under the tine 310 even if it is up in the air or hard to see on the ground.

Figure 4:
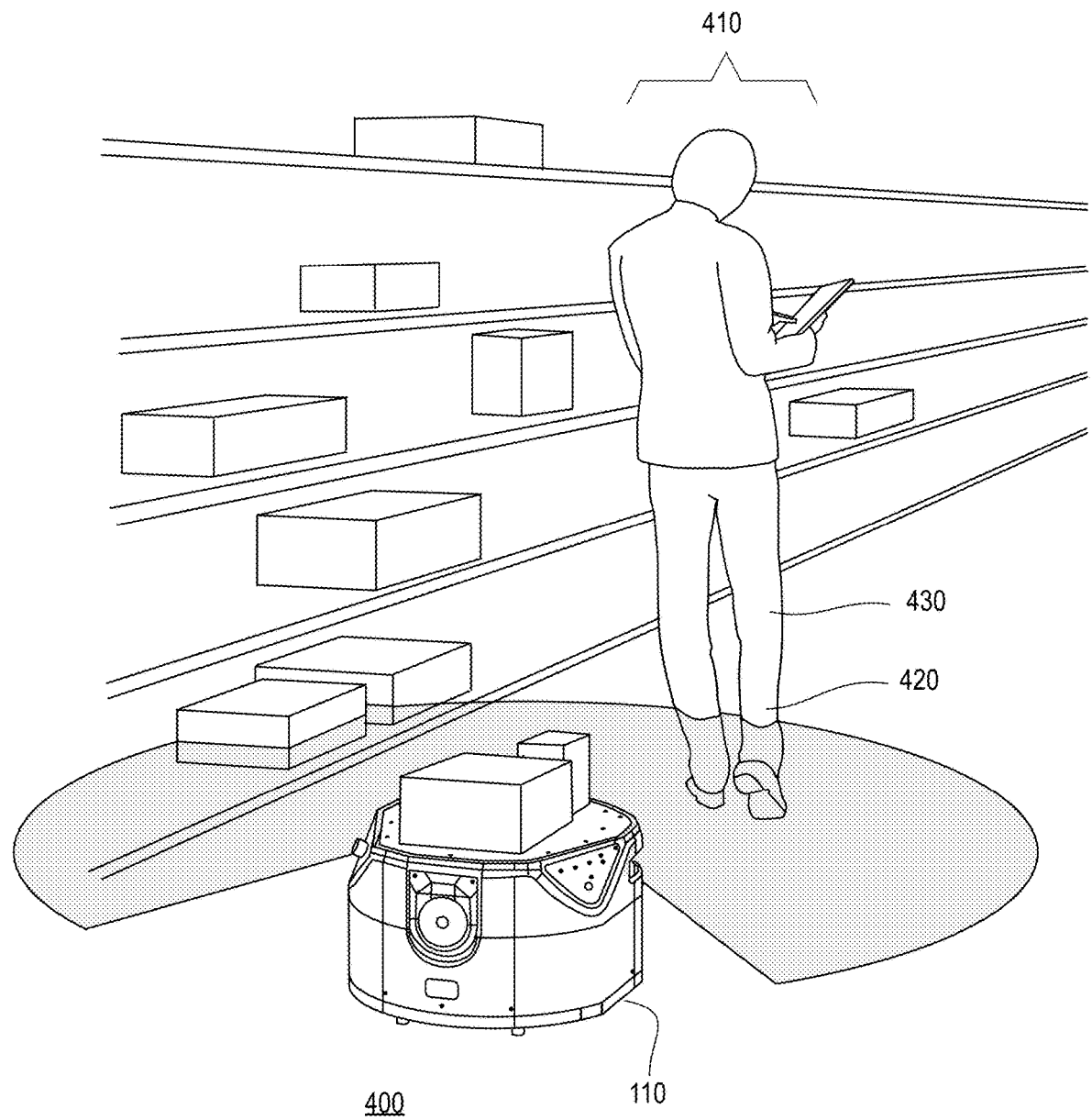
FIG. 4 is a drawing of a system for semantically identifying one or more of an object of interest and a location in a robotic environment, showing a human that has been semantically identified using a retro-reflective marker placed on the legs of the human.

FIG. 4 is a drawing of a system 400 for semantically identifying one or more of an object of interest and a location in an environment of a robot 110, showing a human 410 that has been semantically identified using a retro-reflective marker 420 placed on the legs 430 of the human 410. The robot 110 can more easily and precisely follow a human 410 wearing clothing comprising the retro-reflective marker 420. Higher confidence in detection and recognition is available when the human 410 goes around a corner and the robot 110 briefly loses sight of the human 410.

By identifying a specific object of interest in the environment, the robot can request location information about that object of interest from the server and use that to determine its own location. For example, the robot sees an object of interest and automatically identifies it. For example, the computer sees the object of interest and automatically identifies it. For example, the object of interest comprises a charge dock. For example, the robot asks the server where the charge dock is currently located, and then computes the location of the charge dock relative to the robot. For example, the computer asks the server where the charge dock is currently located, and then computes the charge dock's location relative to the robot to get the robot's overall location. As other examples, the object of interest comprises one or more of a forklift, a box, a pallet, a second robot, a cart, a golf cart, a dock bay door, a human, and a charge dock.

Embodiments of the invention can also be used to find a robot that is mis-localized. The server can order a first robot to look for a mis-localized second robot in the warehouse. The server sends the first robot to a last known location of the mis-localized second robot. The system uses a retro-reflective marker on the mis-localized second robot to help provide a high-confidence identification of the mis-localized second robot. For example, the computer uses a retro-reflective marker on the mis-localized second robot to help provide a high-confidence identification of the mis-localized second robot. For example, alternatively, or additionally, the server uses the retro-reflective marker on the mis-localized second robot to help provide a high-confidence identification of the mis-localized second robot.

Applications of embodiments of the invention include one or more of producing a range of different kits available to a customer desiring to label certain items in a robotic environment, tracking of external resources in a robotic environment, automatically localizing a robot, robust detection of an object of interest at a range of distances, different sensor resolutions for different robots, tracking a cart, tracking a problem with a cart, associating a fulfilled order with a cart that fulfilled the order, calibration purposes, predictive maintenance, positive identification of a robot to supplement server information on the robot's location, reduction of computational load on one or more of a robot and the server, location of a lost robot, re-localization of a lost robot, and localization of an object of interest against one or more of a dock and another annotation.

The system offers an enhanced ability to do one or more of identify a hard robotic keepout zone and advise the robot of the hard robotic keepout zone. The system can instruct the robot to slow its velocity as it approaches a hard keepout zone. The marker can highlight a physical landmark comprising a keepout zone. For example, the marker highlights the keepout zone for a downward-facing camera unable to directly view the keepout zone. For example, the marker comprises a QR code visible on the floor in an area near cart locations. The robot can look down at the floor and learn a cart location.

A system for semantically identifying one or more of an object of interest and a location in a robotic environment comprises a robot. Preferably, although not necessarily, the system for semantically identifying one or more of an object of interest and a location in a robotic environment comprises a mobile robot. For example, the mobile robot is operably connected to a server. Preferably, although not necessarily, the server comprises a fleet management server.

Preferably, although not necessarily, the mobile robot is operably connected to the server through a communication system. Preferably, although not necessarily, the mobile robot is operably connected to the server through a wireless communication system.

The marker can be used to indicate a nearby non-visible area of importance. For example, in the case of a planar laser sensor, the non-visible area comprises one or more of an area above the laser sensor and an area below the laser sensor.

The system can use the retro-reflective markers to automatically calibrate one or more of the vertical and horizontal planes of the camera relative to the robot. That is, one or more of the 3D intensity data and the color images can be used for calibration.

The system is usable without visible light given that infrared sensors commonly comprise an infrared projector. The robot can use the information it generates to do one or more of make a decision about a next task, provide an alert about an identified problem, and provide a chain of custody documentation when moving an object of interest in the environment. For example, the problem comprises a broken caster on a cart.

Figure 5:
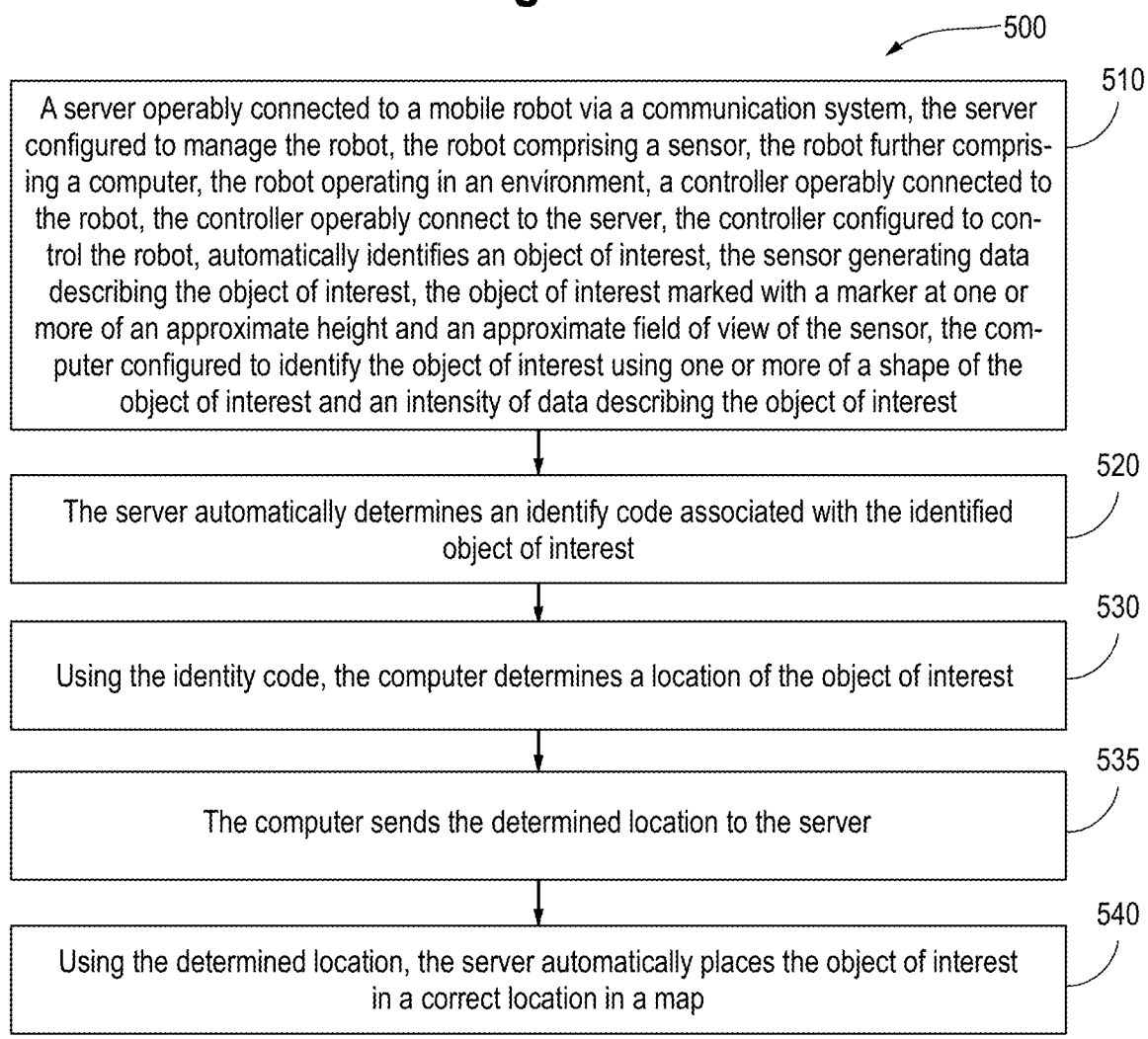
FIG. 5 is a flow chart of a method for semantically identifying an object of interest in an environment of a mobile robot.

FIG. 5 is a flow chart of a method 500 for semantically identifying an object of interest in an environment of a mobile robot.

The order of the steps in the method 500 is not constrained to that shown in FIG. 5 or described in the following discussion. Several of the steps could occur in a different order without affecting the final result.

In step 510, a server operably connected to a mobile robot via a communication system, the server configured to manage the robot, the robot comprising a sensor, the robot further comprising a computer, the robot operating in an environment, a controller operably connected to the robot, the controller operably connected to the server, the controller configured to control the robot, automatically identifies an object of interest, the sensor generating data describing the object of interest, the object of interest marked with a marker at one or more of an approximate height and an approximate field of view of the sensor, the computer configured to identify the object of interest using one or more of a shape of the object of interest and an intensity of data describing the object of interest. Block 510 then transfers control to block 520.

In step 520, the computer automatically determines an identity code associated with the identified object of interest. Block 520 then transfers control to block 530.

In step 530, using the identity code, the computer determines a location of the object of interest. Block 530 then transfers control to block 535.

In step 535, the computer sends the determined location to the server. Block 535 then transfers control to block 540.

In step 540, using the determined location, the server automatically places the object of interest in a correct location in a map. Block 540 then terminates the process.

FIG. 6 is a flow chart of a method 600 for semantically identifying, using a first mobile robot, a location of a mis-localized second mobile robot in an environment of the first mobile robot.

The order of the steps in the method 600 is not constrained to that shown in FIG. 6 or described in the following discussion. Several of the steps could occur in a different order without affecting the final result.

In step 610, a server operably connected to a first mobile robot via a communication system, the server configured to manage the first robot, the first robot comprising a sensor, the first robot further comprising a computer, the first robot operating in an environment, a controller operably connected to the first robot, the controller operably connected to the server, the controller configured to control the first robot, automatically identifies a location of a mis-localized second robot, the sensor generating data describing the second robot, the second robot marked with a marker at one or more of an approximate height and an approximate field of view of the sensor, the computer configured to identify the second robot using one or more of a shape of the second robot and an intensity of data describing the second robot. Block 610 then transfers control to block 620.

In step 620, the server orders the first robot to look for the second robot in a last known location of the second robot. Block 620 then transfers control to block 630.

In step 630, the computer generates a high-confidence identification of the second robot, using the marker. Block 630 then terminates the process.

Advantages of the invention include that applying embodiments of the invention to mobile manipulation to augment workspace with markers on the work surface can improve over traditional methods of single QR codes because a workspace can be defined using retro-reflective tape and then used for calibration and workspace setup.

Another advantage of embodiments of the invention is that the application of a retro-reflective marker to a target increases the confidence of correct identification. Retro-reflective markers effectively expand the sensor's field of view by avoiding restrictions that might otherwise exist of a laser height up of up to approximately 0.4 meters from where the wheels touch the floor and extending out approximately 100 meters from the sensor.

Another advantage of embodiments of the invention is preventing a robot from driving into a danger area even if it is mis-localized, because the retro-reflective marker advises it of the danger area. Another advantage is that the robot can more easily and precisely follow a human wearing clothing comprising a retro-reflective marker. Higher confidence in detection and recognition is available when the human goes around a corner and the robot briefly loses sight of the human.

The system and method for semantically identifying one or more of an object of interest and a location in a robotic environment includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

For example, it will be understood by those skilled in the art that software used by the system and method for semantically identifying one or more of an object of interest and a location in a robotic environment may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of devices other than mobile phones, tablets, and computers without substantially affecting the functioning of embodiments of the invention.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for semantically identifying an object of interest, comprising:
   a mobile robot operating in an environment, the mobile robot comprising (i) a sensor configured to generate sensor data representing a portion of the environment within a field of view of the sensor, and (ii) a computer, the robot operating in the environment;
   a server operably connected to the robot via a communication system, the server configured to manage the robot;
   a controller operably connected to the robot, the controller operably connected to the server, the controller configured to control the robot; and
   a marker disposed in the environment within a field of view of the sensor;
   the computer configured to:
     detect the marker from the sensor data;
     based on the detected marker, determine an identity code associated with an object of interest outside the field of view of the sensor; and
     based on the determined identity code, identify a location of the object of interest outside of the field of view of the sensor and cause the mobile robot to perform a safety action while the object of interest remains outside of the field of view of the sensor of the mobile robot.

2. The system of claim 1, wherein the sensor comprises an infrared sensor.

3. The system of claim 1, wherein the sensor comprises a laser sensor.

4. The system of claim 1, wherein the sensor comprises a three-dimensional (3D) sensor.

5. The system of claim 1, wherein the sensor comprises a three-dimensional (3D) camera configured to provide both two-dimensional (2D) spatial information and also information on depth of the object of interest.

6. The system of claim 1, wherein the marker comprises a QR code.

7. The system of claim 6, wherein the sensor includes a downward-facing camera, and wherein the QR code is visible to the downward-facing camera.

8. The system of claim 7, wherein the system uses the marker to automatically calibrate the camera.

9. The system of claim 1, wherein the object of interest is selected from the group consisting of a forklift, a box, a pallet, a second robot, a cart, a golf cart, a dock bay door, and an obstacle disposed outside of the field of view of the sensor.

10. A method for semantically identifying an object of interest in an environment of a mobile robot, comprising:
receiving, from a sensor of the mobile robot by a computer comprised in the mobile robot, sensor data representing a portion of the environment within a field of view of the sensor;
detecting, by the computer from the sensor data, a marker disposed in the environment within a field of view of the sensor and associated with an object of interest outside the field of view of the sensor;
based on the detected marker, determining, by the computer, an identity code associated with the identified object of interest outside the field of view of the sensor;
using the identity code, by the computer, determining a location of the object of interest;
sending, by the computer, the determined location to a server; and
performing, by the mobile robot, a safety action while the object of interest remains outside of the field of view of the sensor of the mobile robot.

11. A method for semantically identifying, using a first mobile robot, a location of a mis-localized second mobile robot in an environment of the first mobile robot, comprising:
retrieving, by a server operably connected to the first mobile robot, a last known location of the mis-localized second mobile robot, the second mobile robot having a marker;
ordering, by the server, the first mobile robot to look for the second robot in the last known location of the second mobile robot, the first mobile robot configured, in response to the ordering, to detect the marker in sensor data generated by a sensor of the first mobile robot, the sensor data representing a portion of the environment within a field of view of the sensor;
receiving, at the server from the first mobile robot, data encoded in the detected marker; and
generating, by the server, a high-confidence identification of the current location of the second mobile robot, using the data encoded in the marker detected by the first mobile robot.

12. The method of claim 11, further comprising a step of:
using the determined current location, by the server, automatically placing the second mobile robot in a correct location in a map.

13. The method of claim 12, further comprising a step, performed after the placing step, of instructing the first robot, by the server, to apply a barcode to a charge dock.

14. The method of claim 13, further comprising a step, performed after the instructing step, of counting, by the server, charge cycles using the barcode.

* * * * *